United States Patent
Westerman et al.

(10) Patent No.: US 8,557,914 B2
(45) Date of Patent: Oct. 15, 2013

(54) LATEX COMPOSITIONS

(75) Inventors: I. John Westerman, Wadsworth, OH (US); Jaclyn Laurich, Fairlawn, OH (US); R. Michael Flickinger, Copley, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 126 days.

(21) Appl. No.: 13/062,851

(22) PCT Filed: Sep. 8, 2009

(86) PCT No.: PCT/US2009/056221
§ 371 (c)(1),
(2), (4) Date: May 31, 2011

(87) PCT Pub. No.: WO2010/028363
PCT Pub. Date: Mar. 11, 2010

(65) Prior Publication Data
US 2011/0224362 A1    Sep. 15, 2011

Related U.S. Application Data

(60) Provisional application No. 61/095,183, filed on Sep. 8, 2008.

(51) Int. Cl.
*C08L 55/00* (2006.01)

(52) U.S. Cl.
USPC ....................................................... 524/565

(58) Field of Classification Search
USPC ....................................................... 524/565
See application file for complete search history.

(56) References Cited

U.S. PATENT DOCUMENTS

| | | | |
|---|---|---|---|
| 5,302,655 A * | 4/1994 | Guillaume et al. | 524/547 |
| 5,420,190 A | 5/1995 | Gane | |
| 6,884,468 B1 | 4/2005 | Abundis et al. | |
| 7,361,399 B2 | 4/2008 | Song et al. | |
| 7,749,580 B2 | 7/2010 | Song et al. | |
| 2003/0105222 A1 * | 6/2003 | Choi et al. | 524/801 |
| 2005/0089643 A1 * | 4/2005 | Abundis et al. | 427/391 |
| 2005/0260428 A1 | 11/2005 | Song et al. | |
| 2006/0257593 A1 | 11/2006 | Haenen | |
| 2007/0212532 A1 | 9/2007 | Krumbacher et al. | |
| 2010/0080919 A1 | 4/2010 | Krumbacher et al. | |
| 2011/0069106 A1 | 3/2011 | Song et al. | |

FOREIGN PATENT DOCUMENTS

| | | |
|---|---|---|
| DE | 10 2004 045172 A1 | 3/2006 |
| WO | WO 2004 030917 A1 | 4/2004 |
| WO | WO 2005 115763 A1 | 12/2005 |

OTHER PUBLICATIONS

Rule 71(3) EPC Communication in counterpart EP appl. No. 09 792 318.9, dated Dec. 11, 2012.
International Search Report for International Appl. No. PCT/US2009/056221 dated Dec. 17, 2009; 3 pages.
International Preliminary Report on Patentability for International Appl. No. PCT/US2009/056221 dated Mar. 8, 2011; 5 pages.

* cited by examiner

*Primary Examiner* — Ling Choi
*Assistant Examiner* — Lanee Reuther
(74) *Attorney, Agent, or Firm* — Renner, Kenner, Greive, Bobak, Taylor & Weber

(57) ABSTRACT

A latex binder for a pigmented paper coating, the latex including particles of an emulsion copolymer comprising (i) from about 15 to about 35 weight % mer units deriving from the polymerization of acrylonitrile; (ii) from about 25 to about 65 weight % mer units deriving from the polymerization of conjugated diene monomer; and (iii) from about 5 to about 55 weight % mer units deriving from the polymerization of alkenyl aromatic monomer, based upon the total weight of the mer units within the particle.

15 Claims, No Drawings

LATEX COMPOSITIONS

CROSS-REFERENCE TO RELATED APPLICATIONS

This application claims the benefit of international Application Serial No. PCT/US09/56221, filed Sep. 8, 2009, which gains priority from U.S. Provisional Ser. No. 61/095,183, filed on Sep. 8, 2008, which are incorporated herein by reference.

FIELD OF THE INVENTION

This invention relates to styrene-butadiene-based latex compositions having a large particle size and a relatively high acrylonitrile content. The latex compositions are useful in paper coatings.

BACKGROUND OF THE INVENTION

Paper coating lattices, such as styrene-butadiene emulsion polymers, are typically added to bind inorganic pigments together in order to make a paper surface smooth and uniform for printing. Coating printing strength, gloss, blister resistance, smoothness, print gloss and print mottle are all key characteristics of coated paper and can be impacted by the latex composition. Prior attempts to improve one of these characteristics have generally resulted in compromising other characteristics. In accordance to conventional offset printing wisdom, for instance, increasing the latex average particle size decreases printing strength of a coated paper, while it improves its glossability.

U.S. Pat. No. 5,420,190 teaches a paper coating composition for use in gravure printing. Data is provided to illustrate that the average particle size of the latex should be limited. For styrene butadiene latex having an average particle size of greater than 200 nanometers, high shear viscosity resulted in deterioration in rotogravure print quality of coated paper prepared with the composition.

There is a need for a latex composition that provides a novel balance of properties, maximizing as many of the above required properties as possible.

SUMMARY OF THE INVENTION

One or more embodiments of the present invention provide a latex binder for a pigmented paper coating, the latex including particles of an emulsion copolymer comprising (i) from about 15 to about 35 weight % mer units deriving from the polymerization of acrylonitrile; (ii) from about 25 to about 65 weight % mer units deriving from the polymerization of conjugated diene monomer; and (iii) from about 5 to about 55 weight % mer units deriving from the polymerization of alkenyl aromatic monomer, based upon the total weight of the mer units within the particle.

Other embodiments provide a method for preparing a coated cellulosic substrate, the method comprising the step of applying a coating composition to a cellulosic substrate, the coating composition including a plurality of polymeric particles, where at least a portion of the particles are characterized by (i) including at least 25 weight % mer units deriving from conjugated diene monomer, at least 5 weight % mer units deriving from alkenyl aromatic monomer, and at least 15 weight % mer units deriving from acrylonitrile monomer; and (ii) a weight average particle size of at least 150 nm.

Still other embodiments provide a paper coating composition comprising water and from about 45 to about 68 weight % solids, where the solids portion of the latex includes (i) from about 75 to about 95 weight % pigment; and from about 2 to about 20 weight % polymeric particles, where at least a portion of the particles are characterized by (i) including at least 25 weight % mer units deriving from conjugated diene monomer, at least 5 weight % mer units deriving from alkenyl aromatic monomer, and at least 15 weight % mer units deriving from acrylonitrile monomer; and (ii) a weight average particle size of at least 150 nm.

Still other embodiments provide a method for producing a printed paper, the method comprising offset printing a coated paper, where the coated paper has been coated by applying a coating composition to a cellulosic substrate, the coating composition including a plurality of polymeric particles, where at least a portion of the particles are characterized by (i) including at least 25 weight % mer units deriving from conjugated diene monomer, at least 5 weight % mer units deriving from alkenyl aromatic monomer, and at least 15 weight % mer units deriving from acrylonitrile monomer; and (ii) a weight average particle size of at least 150 nm.

Still other embodiments provide a method for producing a printed paper, the method comprising rotogravure printing a coated paper, where the coated paper has been coated by applying a coating composition to a cellulosic substrate, the coating composition including a plurality of polymeric particles, where at least a portion of the particles are characterized by (i) including at least 25 weight % mer units deriving from conjugated diene monomer, at least 5 weight % mer units deriving from alkenyl aromatic monomer, and at least 15 weight % mer units deriving from acrylonitrile monomer; and (ii) a weight average particle size of at least 150 nm.

Still other embodiments provide a method of supplying a latex to the paper industry for forming coated paper that can be used in rotogravure printing and offset printing, the method comprising supplying a latex composition that includes an emulsion copolymer polymerized from monomer comprising from about 15 to about 35 weight % acrylonitrile; from about 25 to about 65 weight % conjugated diene; and from about 5 to about 55 weight % alkenyl aromatic; where the emulsion copolymer is in the form of particles having a weight average diameter of at least 150 nm.

Still other embodiments provide a latex binder for a pigmented paper coating, the latex including an emulsion copolymer polymerized from monomer comprising acrylonitrile, conjugated diene monomer, and alkenyl aromatic monomer, wherein the molar ratio of conjugated diene monomer to the total of alkenyl aromatic monomer and acrylonitrile is from 1:0.3 to about 1:3.

DETAILED DESCRIPTION OF ILLUSTRATIVE EMBODIMENTS

The latex compositions of the present invention contain at least one particle population that can be characterized by a relatively large particle size and a relatively high content of mer units deriving from acrylonitrile. This population of particles may be simply referred to as the large acrylonitrile-rich particle population. In one or more embodiments, the latex is by design a bimodal blend including a large acrylonitrile-rich particle population and a second particle population that is distinct from the large acrylonitrile-rich population. In one or more embodiments, the large acrylonitrile-rich particles are characterized by a glass transition temperature (Tg) of less than 20° C.

In one or more embodiments, the size of the particles in the large acrylonitrile-rich population may be characterized by a weight average particle size (Dw) of greater than 150 nanometers (nm), in other embodiments greater than 160 nm, in other embodiments greater than 170 nm, in other embodiments greater than 180 nm, in other embodiments greater than 190 nm, and in other embodiments greater than 200 nm. In these or other embodiments, the size of the particles in the large acrylonitrile-rich population may be characterized by a Dw of less than 300 nm, in other embodiments less than 290 nm, in other embodiments less than 280 nm, in other embodiments less than 270 nm, in other embodiments less than 260 nm, in other embodiments less than 250 nm, in other embodiments less than 240 nm, and in other embodiments less than 230 nm.

In these or other embodiments, the particles in the large acrylonitrile-rich population may be characterized by a particle size polydispersity (which is the Dw over the number average particle size (Dn)), of less than 5, in other embodiments less than 4, in other embodiments less and 3, and in other embodiments less than 2.

In one or more embodiments, the particle size characteristics of the particles can be determined by employing known techniques. For example, light scattering techniques may be used. Known techniques for determining weight-average particle size (Dw) and number-average particle size (Dn) are disclosed in Collins, *Measurement of Particle Size and Particle Size Distribution*, EMULSION POLYMERIZATION AND EMULSION POLYMERS, Wiley & Sons, 1997, which is incorporated herein by reference. In particular embodiments, the particle size is determined using a NICOMP Model 200/370.

In those embodiments where the latex includes a bimodal distribution of particles sizes, the second population of particles may be characterized by an weight average particle size (Dw) of less than 150 nanometers (nm), in other embodiments less than 140 nm, and in other embodiments less than about 120 nm. In these or other embodiments, the size of the particles in the second population may be characterized by a Dw of at least 50 nm, in other embodiments at least 75 nm, and in other embodiments at least 100 nm. In these or other embodiments, the particles in the second population may be characterized by a particle size polydispersity (which is the Dw over the number average particle size (Dn)), of less than 5, in other embodiments less than 4, in other embodiments less and 3, and in other embodiments less than 2.

In one or more embodiments, the large acrylonitrile-rich polymer particles may be characterized by having a Tg of greater than $-50°$ C., in other embodiments greater than $-35°$ C., in other embodiments greater than $-30°$ C., and in other embodiments greater than $-25°$ C. In these or other embodiments, the polymer particles are characterized by a Tg of less than 20° C., in other embodiments less than 15° C., in other embodiments less than 10° C., in other embodiments less than 5° C., in other embodiments less than 0° C., in other embodiments less than $-5°$ C. and in other embodiments less than $-10°$ C. In one or more embodiments, Tg may be determined based upon dried samples or films of the latex using differential scanning calorimetry (DSC) techniques.

In one or more embodiments, the large acrylonitrile-rich polymer particles may be characterized by having a gel content of from about 55 to about 95%, in other embodiments from about 70 to about 90%, and in other embodiments from about 75 to about 85% based upon the entire weight of the particles. In one or more embodiments, the gel may be determined based on insoluble fractions within a solvent such as THF or toluene.

In one or more embodiments, the large acrylonitrile-rich polymer particles may be characterized by including from about 1 to about 15%, in other embodiments from about 4 to about 12%, and in other embodiments from about 6 to about 11%, units bearing an acid functionality, i.e., a carboxylic acid group based upon the entire weight of the polymer particles. In one or more embodiments, the large acrylonitrile-rich polymer particles may be characterized by including at least 0.2%, in other embodiments at least 0.3%, in other embodiments at least 0.4%, in other embodiments at least 0.5% units bearing an acid functionality, i.e., a carboxylic acid group based upon the entire weight of the polymer particles. In one or more embodiments, the large acrylonitrile-rich polymer particles may be characterized by including less than 10%, in other embodiments less than 8%, in other embodiments less than 7%, in other embodiments less than 5%, units bearing an acid functionality, i.e., a carboxylic acid group based upon the entire weight of the polymer particles. Acid content can be determined based upon the weight of the acid bearing monomers employed in synthesizing the polymer or by FTIR techniques.

In one embodiment, the particles of the large acrylonitrile-rich population may derive from copolymerization of aliphatic conjugated diene monomer, alkenyl aromatic monomer, ethylenically unsaturated nitrile monomer, optionally ethylenically unsaturated acid monomer, optionally ethylenically unsaturated functional monomer, optionally ethylenically unsaturated non-functional ester monomer, and optionally other monomer copolymerizable therewith.

Aliphatic conjugated diene monomers include those having from about 4 to about 8 carbon atoms or optionally from about 4 to about 6 carbon atoms. Examples of diene monomers include piperylene, isoprene, 2,3-dimethyl-1,3-butadiene, 1,3-cyclohexadiene, 1,3-butadiene, or mixtures thereof. Mixtures of two or more conjugated dienes may also be used.

Alkenyl aromatic monomers include compounds having from about 8 to about 12 total carbon atoms. Examples of alkenyl aromatic compounds include styrene, alpha-methyl styrene, p-tertiary butyl styrene, methyl vinyl toluene, p-vinyl toluene, divinyl benzene, and 3-ethyl styrene, or mixtures thereof.

Examples of nitriles of ethylenically unsaturated carboxylic acid include acrylonitrile and methacrylonitrile. Inasmuch as acrylonitrile is the most popular nitrile of ethylenically unsaturated carboxylic acids, reference may be simply made to acrylonitrile, but unless otherwise specified, is not intended to limit beyond nitriles of ethylenically unsaturated carboxylic acid.

Examples of acid-bearing monomers include ethylenically unsaturated carboxylic acid monomers such as acrylic acid, methacrylic acid, fumaric acid, crotonic acid, maleic acid, itaconic acid, 2-carboxyethylacrylate, 2-acrylamido-2-methylbutanoic acid, and the like, and combinations of two or more such acids.

In one or more embodiments, functional monomer includes monomer that will provide electronic stabilization to the particles in latex. In one or more embodiments, functional monomers include hydroxyl and/or amide functionality or groups. In one or more embodiments, the simple presence of a carboxyl group, such as may be present in an ester group or moiety, is not considered a functional group.

Examples of amides of ethylenically unsaturated carboxylic acid include various unsaturated amides or derivatives thereof having a total of from about 3 to about 12 carbon atoms. Examples of unsaturated amides or derivatives thereof include acrylamide, methacrylamide, N,N-methylenebisacrylamide, N-methylolacrylamide, N-methylolmethacrylamide, N-ethyoxymethylacrylamide, N-butoxymethylacrylamide, N-isobutoxymethylacrylamide, N,N-dimethylacrylamide, derivatives thereof, and mixtures thereof.

In one or more embodiments, hydroxyl-containing monomers include hydroxyl derivatives of acrylates and methacrylates. In one or more embodiments, the alkyl portion of these compounds includes from 1 to 10, optionally from 1 to 4, carbon atoms. Examples of ester derivatives include hydroxyethyl acrylate, hydroxyethyl methacrylate, hydroxypropyl acrylate, hydroxypropyl methacrylate, 4-hydroxybutyl acrylate, and ethylene oxide extended derivatives of ethyleneglycol methacrylate.

In one or more embodiments, non-functional esters of ethylenically unsaturated carboxylic acid include alkyl (meth) acrylates. These monomers are devoid of acid, hydroxyl, and amide groups. Examples include methylacrylate, methyl methacrylate, butyl acrylate, 2-ethylhexyl acrylate, iso-decylacrylate, propyl acrylate, ethyl acrylate, ethyleneglycol diacrylate, ethyleneglycol dimethacrylate, diethyleneglycol diacrylate, diethyleneglycol dimethacrylate, triethyleneglycol diacrylate, and triethyleneglycol dimethacrylate.

Other conventional monomers that can optionally be utilized in conventional amounts include various organic salts, for example sodium styrene sulfonate, sodium methallyl sulfonate, the alkali, ammonium, and amine salts of 2-acrylamido-2-methylpropanesulfonate, and the 3-sulfopropyl (meth)acrylate salt of sodium or potassium. In some embodiments, these organic salts aid in colloidal stability.

In one or more embodiments, the particles of the large acrylonitrile-rich population of particles include at least 25 weight %, in other embodiments at least 30 weight %, in other embodiments at least 35 weight %, and in other embodiments at least 40 weight % mer units deriving from the polymerization of conjugated diene monomer based on the total weight of the mer units within the particles. In these or other embodiments, the particles of the large acrylonitrile-rich population of particles include less than 65 weight %, in other embodiments less than 60 weight %, in other embodiments less than 55 weight %, and in other embodiments less than 50 weight % mer units deriving from the polymerization of conjugated diene, based on the total weight of the mer units within the particles.

In one or more embodiments, the composition of the large acrylonitrile-rich particles may be described by the molar ratios of monomers that are polymerized to form the particles. In one or more embodiments, the amount of relatively soft monomer, i.e. conjugated diene, may be compared to the combined amount of relatively hard monomers, i.e. alkenyl aromatic and acrylonitrile. This may be expressed by the formula moles conjugated diene:(moles alkenyl aromatic+ moles acrylonitrile)

In one or more embodiments, the molar ratio of conjugated diene monomer to the total of alkenyl aromatic monomer and acrylonitrile is from 1:0.3 to about 1:3, in other embodiments from 1:0.5 to about 1:2, in other embodiments from 1:0.75 to about 1:1.8, in other embodiments from 1:0.8 to about 1:1.5.

In one or more embodiments, the number of mer units deriving from the conjugated diene monomer relative to the total number of mer units deriving from alkenyl aromatic and acrylonitrile monomer would fall within the molar ratios described above.

In one or more embodiments, the particles of the large acrylonitrile-rich population of particles include at least 5 weight %, in other embodiments at least 10 weight %, in other embodiments at least 15 weight %, and in other embodiments at least 20 weight % mer units deriving from the polymerization of alkenyl aromatic, based on the total weight of the mer units within the particles. In these or other embodiments, the particles of the large acrylonitrile-rich population of particles include less than 55 weight %, in other embodiments less than 50 weight %, in other embodiments less than 45 weight %, and in other embodiments less than 40 weight % mer units deriving from the polymerization of alkenyl aromatic, based on the total weight of the mer units within the particles.

As described above, the composition of the large acrylonitrile-rich particles may be described by the molar ratios of monomers that are polymerized to form the particles. The amount of alkenyl aromatic monomer may be compared to the amount of acrylonitrile. In one or more embodiments, the molar ratio of alkenyl aromatic monomer to acrylonitrile is from 1:0.3 to about 1:7, in other embodiments from 1:0.4 to about 1:3, in other embodiments from about 1:0.45 to about 1:1.5, in other embodiments from about 1:0.5 to about 1:1. In one or more embodiments, the number of mer units deriving from the alkenyl aromatic monomer relative to the number of mer units deriving from acrylonitrile monomer would fall within the molar ratios described above.

In one or more embodiments, the particles of the large acrylonitrile-rich population of particles include at least 15 weight %, in other embodiments at least 18 weight %, in other embodiments at least 20 weight %, and in other embodiments at least 22 weight % mer units deriving from the polymerization of acrylonitrile, based on the total weight of the mer units within the particles. In these or other embodiments, the particles of the large acrylonitrile-rich population of particles include less than 35 weight %, in other embodiments less than 33 weight %, in other embodiments less than 30 weight %, and in other embodiments less than 27 weight % mer units deriving from the polymerization of acrylonitrile, based on the total weight of the mer units within the particles.

In one or more embodiments, the particles of the large acrylonitrile-rich population of particles include at least 0.2 weight %, in other embodiments at least 0.3 weight %, in other embodiments at least 0.5 weight %, in other embodiments at least 0.8 weight %, in other embodiments at least 1 weight %, in other embodiments at least 1.5 weight %, and in other embodiments at least 2.0 weight % mer units deriving from the polymerization of acid monomer, based on the total weight of the mer units within the particles. In these or other embodiments, the particles of the large acrylonitrile-rich population of particles optionally include less than 8 weight %, in other embodiments less than 7 weight %, in other embodiments less than 5 weight %, and in other embodiments less than 3 weight % mer units deriving from the polymerization of acid monomer, based on the total weight of the mer units within the particles.

In one or more embodiments, the particles of the large acrylonitrile-rich population of particles include at least 1 weight %, in other embodiments at least 2 weight %, in other embodiments at least 3 weight %, and in other embodiments at least 4 weight % mer units deriving from the polymerization of functional monomer, based on the total weight of the mer units within the particles. In these or other embodiments, the particles of the large acrylonitrile-rich population of particles include less than 8 weight %, in other embodiments less than 7 weight %, in other embodiments less than 6 weight %, and in other embodiments less than 5 weight % mer units deriving from the polymerization of functional monomer, based on the total weight of the mer units within the particles.

In one or more embodiments, the particles of the large acrylonitrile-rich population of particles optionally include at least 0.2 weight %, in other embodiments at least 0.5 weight %, in other embodiments at least 0.8 weight %, and in other embodiments at least 1.2 weight % mer units deriving from the polymerization of amide monomer, based on the total weight of the mer units within the particles. In these or other embodiments, the particles of the large acrylonitrile-rich population of particles optionally include less than 5 weight %, in other embodiments less than 4 weight %, in other embodiments less than 3 weight %, and in other embodiments less than 2 weight % mer units deriving from the polymerization of amide monomer, based on the total weight of the mer units within the particles.

In one or more embodiments, the particles of the large acrylonitrile-rich population of particles optionally include at least 0.2 weight %, in other embodiments at least 0.5 weight %, in other embodiments at least 0.8 weight %, and in other embodiments at least 1.2 weight % mer units deriving from the polymerization of hydroxyl monomer, based on the total weight of the mer units within the particles. In these or other embodiments, the particles of the large acrylonitrile-rich population of particles optionally include less than 5 weight %, in other embodiments less than 4 weight %, in other embodiments less than 3 weight %, and in other embodiments less than 2 weight % mer units deriving from the polymerization of hydroxyl monomer, based on the total weight of the mer units within the particles.

In one or more embodiments, the particles of the large acrylonitrile-rich population of particles optionally include at least 0.2 weight %, in other embodiments at least 0.5 weight %, in other embodiments at least 1 weight %, and in other embodiments at least 2 weight % mer units deriving from the polymerization of non-functional ester monomer, based on the total weight of the mer units within the particles. In these or other embodiments, the particles of the large acrylonitrile-rich population of particles optionally include less than 5 weight %, in other embodiments less than 3 weight %, in other embodiments less than 2 weight %, in other embodiments less than 1 weight %, in other embodiments less than 0.5 weight %, and in other embodiments less than 0.1 weight % mer units deriving from the polymerization of non-functional ester monomer, based on the total weight of the mer units within the particles. In one or more embodiments, the particles of the large acrylonitrile-rich population of particles are devoid or substantially devoid of non-functional ester monomer, e.g. methyl methacrylate, where substantially devoid includes that amount or less that will not have an appreciable impact on the particle or the latex.

One or more embodiments of the invention are directed to latex compositions that include the large acrylonitrile-rich particle population described above. In particular embodiments, substantially all of the particles of the latex are included in the large acrylonitrile population. In other embodiments, the latex may comprise a blend of two or more distinct particle populations. Advantageously, a latex containing a large acrylonitrile-rich particle population according to the present invention may be blended with a distinct particle population, where the distinction could be a difference in particle size or in the composition of the particles. In one or more embodiments, a latex containing a large acrylonitrile-rich particle population may be blended with commercially available latex compositions that include smaller particle sizes. In one or more embodiments, a latex containing a large acrylonitrile-rich particle population may be blended with latex that comprises SB polymers, SBA polymers, or functionalized polymers thereof.

In one or more embodiments, the latex of the present invention may include at least 35% by weight, in other embodiments at least 45% by weight, in other embodiments at least 55% by weight, in other embodiments at least 75% by weight, and in other embodiments at least 95% by weight large acrylonitrile-rich particles based upon the total weight of the solids content of the latex (i.e. the total weight of the particles).

A latex containing large acrylonitrile-rich particle population may be prepared by employing conventional emulsion polymerization techniques. Emulsion polymerization is described in U.S. Pat. Nos. 5,166,259 and 6,425,978, which are incorporated herein by reference. In general, these processes employ the use of a free-radical initiator to initiate the polymerization of monomer in the presence of a surfactant. Polymerization is typically carried out at a temperature of about 45° C. to about 90° C., and optionally from about 55 to about 75° C.

Whether semi-continuous addition or incremental polymerization is employed, or separate polymerization followed by blending, ingredients that are typically employed in addition to the monomers described above include initiators, surfactants, chain transfer agents, neutralizing agents, chelating agents, and emulsifiers.

Any of those free-radical emulsion polymerization initiators conventionally employed in the art may be employed in preparing the polymers or emulsion lattices of this invention. Exemplary initiators include ammonium persulfate, sodium persulfate, potassium persulfate, tert-butyl hydroperoxide, and di-tert-butyl cumene. These initiators may be used in conjunction with a reducing agent such as iron salts, amines, ascorbic acids, sodium salts of ascorbates, sodium formaldehyde sulfoxylates, sodium hydrosulfite, sodium thiosulfate, sodium metabisulfite, sodium salts of substituted sulfur-oxy acetic acids, and mixtures thereof. Conventional amounts of initiator and reducing agent can be used in preparing the lattices of this invention. In one embodiment, about 0.05 to about 2.5, and optionally from about 0.1 to about to about 2.0 parts by weight initiator per 100 parts by weight monomer is used.

The latex composition may include a surfactant. In one embodiment, the surfactant includes an alkali metal salt of an alkyl sulfosuccinate. Examples of alkali salts of alkyl sulfosuccinates include sodium dihexyl sulfosuccinate, sodium dioctyl sulfosuccinate, sodium octane sulfonate, alkyl phenol ethoxylates, fatty alcohol ethoxylates, alkyl polyglucosides, alkyl phosphates, and mixtures thereof.

In another embodiment, the surfactant includes salts of alkyl sulfates, salts of organo disulfonates. Examples of salts of alkyl sulfates include sodium lauryl sulfate, which is available under the tradename Stepanol WA. Examples of salts of organo disulfonates include sodium dodecyl diphenyloxide disulfonate, which is available under the tradename Dowfax 2A1. Other Examples of surfactants include sodium laureth sulfate, Laureth-3 (triethylene glycol dodecyl ether), Laureth-4 (PEG-4 lauryl ether), Laureth-5 (PEG-5 lauryl ether), Laureth-6 (PEG-6 lauryl ether), Laureth-7 (PEG-7 lauryl ether), sodium lauryl ether sulfate, sodium laureth-12 sulfate (PEG (12) lauryl ether sulfate, and sodium laureth-30 sulfate (PEG (30) lauryl ether sulfate).

In yet another embodiment, especially where the latex is foamed, the composition may include disodium stearyl sulfosuccinamate, which is available under the tradename Aerosol 18. This surfactant may be employed in conjunction with one or more of the following other surfactants.

Other examples of surfactants include alkyl sulfates, alkyl sulfosuccinates, alkyl aryl sulfonates, alpha-olefin sulfonates, fatty or rosin acids salts, NPE, alkyl aryl sulfonates, alkyl phenol ethoxylates, fatty acid alcohol ethoxylates, and mixtures thereof.

The surfactant is typically present in an amount from about 0.1 to about 10% by weight, optionally from about 1 to about 6% by weight, optionally from about 2 to about 4% by weight based upon the total weight of the composition.

In one embodiment, the surfactant includes a blend of sodium dihexyl sulfosuccinate and sodium dioctyl sulfosuccinate. The blend can be adjusted to control or obtain a desired critical micelle concentration. The dihexyl to dioctyl weight ratio can vary from about 0.05:1 to about 1:0.05.

Any of those chain transfer agents conventionally employed in the emulsion polymerization of conjugated diene monomers may be employed in preparing the polymers or lattices of this invention. Exemplary chain transfer agents include, alkyl mercaptans, carbon tetrachloride, carbon tetrabromide, $C_2$-$C_{22}$ n-alkyl alcohols, $C_2$-$C_{22}$ branched alcohols, 2,4-diphenyl-4-methyl-1-pentene, and mixtures thereof. Conventional amounts of the chain transfer agent can be used in synthesizing the latex.

The pH of the latex can be neutralized by the addition of a base such as potassium hydroxide, sodium bicarbonate, potassium carbonate, ammonium hydroxide, sodium hydroxide, organic amines such as triethylamine, triethanolamine, AMP 95, and mixtures thereof.

As those skilled in the art will appreciate, it is conventional to neutralize the latex to a pH of about 4.5 to about 8.0, and optionally from about 5.5 to about 7.5.

The emulsifiers can generally be any surfactant, soap, or the like, which are well known in the art and stable at the pH of the bimodal latex in accordance with the present invention. Examples of specific emulsifiers include alkyl sulfates, alkyl sulfosuccinates, alkyl aryl sulfonates, α-olefin sulfonates, fatty or resin acid salts, nonyl or octyl phenol reaction products of ethylene oxide and the like. The alkyl portion of the various emulsifiers generally has from about 8 to about 18 carbon atoms. Examples of specific surfactants include sodium lauryl sulfate, sodium sulfosuccinates such as sodium dimethylamyl sulfosuccinate, sodium dodecyl diphenyloxide disulfonate and the like. The amount of emulsifier present is sufficient to obtain an aqueous emulsion of the monomers. Such an amount is typically from about 0.5 to 3.0 parts by weight per 100 parts by weight of the total amount of monomers added. Other surfactants that may be utilized include those identified in Surface Active Agents, Schwartz and Perry, Vol. I, Interscience Publishers, Inc., New York, 1958; Surface Activity, Moilet, Collie and Black, D. Van Nostrand Company, Inc. New York, 1961; Organic Chemistry, Feiser and Feiser, D. C. Heath and Company, Boston, 1944; and The Merck Index, Seventh Edition, Merck & Co., Inc., Rahway, N.J., 1960, all of which are hereby incorporated by reference.

Chelating agents may also be used during polymerization to tie up various metal impurities as well as to achieve a uniform polymerization. Examples of specific chelating agents include ethylene diamine tetra-acetic acid, nitrilotriacetic acid, citric acid, and their ammonium, potassium and sodium salts. The amounts of the chelating agents may range from about 0.01 to about 0.2 parts by weight per 100 parts by weight of the total amount of monomers added.

In one embodiment, a semi-continuous polymerization process is employed. In general, a first polymer seed is provided to the reactor, either by addition of a pre-formed seed that may be prepared in an independent step (i.e., external seed), or by in situ formation in the reactor as described herein below for incremental polymerization. A first stream of monomers maybe added uniformly over time to the reactor containing the first polymeric seed. After a pre-determined time interval, a second polymeric seed may be either formed in situ or provided as a pre-formed seed. A second stream of monomers may be added uniformly over time. In one embodiment, the second stream of monomers is characterized by a higher acid content than the first stream of monomers.

In another embodiment, incremental polymerization is employed. In general, the incremental polymerization process is begun by combining a first set of one or more polymerizable monomers, surfactant, initiator, chain transfer agent, and optionally chelating agent, to form an aqueous polymerizable mixture. One or more of the materials may be added over a series of one or more stages. Subsequently, a second set of one or more polymerizable monomers, surfactant, initiator, and chain transfer agent may be added to the aqueous mixture. One or more of the materials may be added over a series of one or more stages.

In the incremental polymerization process, the ingredients may be added neat or in combination with deionized water, and in some embodiments, two or more of the ingredients are pre-mixed.

In one embodiment, the incremental process includes the step of forming an initial polymerizable mixture by combining two or more aqueous emulsion polymerizable monomers, optionally including at least one acid-bearing monomer, an initiator, a surfactant, a chain transfer agent, and optionally a chelating agent. The surfactant is typically added in an amount above the critical micelle concentration. The order of addition may vary. In one embodiment, the monomers, surfactant, and chelating agent are added to a reactor, heated, and then an aqueous mixture of free radical initiator is added. The aqueous reactants are allowed to react to form a first polymeric seed, at a temperature of about 65 to about 77° C.

Subsequently, additional aqueous emulsion polymerizable monomers, a surfactant, an initiator, a chain transfer agent, and optionally a chelating agent, are added to the first polymeric seed. The two or more monomers in the initial polymerizable mixture and the additional monomers may be the same or different. In one or more embodiments, the additional aqueous polymerizable monomers include an acid-bearing monomer.

In one or more embodiments, when the total monomer charge is considered, an emulsion copolymer is polymerized from a monomer charge that comprises from about 15 to about 35 weight % acrylonitrile, from about 25 to about 65 weight % conjugated diene monomer, and from about 5 to about 55 weight % alkenyl aromatic monomer, based upon the total weight of monomer in the monomer charge.

In one or more embodiments, the molar ratio of conjugated diene monomer to the total of alkenyl aromatic monomer and acrylonitrile in the total monomer charge is from 1:0.3 to about 1:3, in other embodiments from 1:0.5 to about 1:2, in other embodiments from 1:0.75 to about 1:1.8, in other embodiments from 1:0.8 to about 1:1.5.

In one embodiment, the monomers and other components are charged to the reactor at a rate faster than the polymerization rate of the monomers, over one or more separate stages, such that after each charge the mixture is allowed to react within the reactor. The monomers polymerize within the aqueous mixture to form particle population A. In one or more embodiments, the reaction is allowed to proceed to an aqueous mixture having about 29 to 33 percent solids, which is believed to correspond to about 70 to 80 percent conversion of the monomer.

In certain embodiments, aqueous emulsion polymerizable monomers, chain transfer agent and surfactant are charged to the reaction zone of the reactor in stages. These staged monomers may be the same or different from the monomers employed to form the second polymeric seed. For example, the second seed may be initially formed by combining an initiator, a surfactant, and an aqueous polymerizable monomer, and the optional acid-bearing monomer may be added in subsequent stages. At constant percent solids content, the monomer conversion is believed to be approximately 98%.

Optionally, components including an initiator, defoamer, and sodium hydroxide may be added to the latex. Subsequently, the latex may be stripped until the residual alkenyl aromatic monomer is about 0.05% or less. After stripping, a biocide may be added, as is known in the art.

In one or more embodiments, the particle size of the particle populations may depend upon the amount of surfactant employed. For example, increasing the amount of surfactant added during a seeding stage can result in the formation of a greater number of particles and can also result in particles of smaller size. In certain embodiments of the present invention, the amount of surfactant added during the first seed formation is different from the amount of surfactant added during the second formation. This may result in a bimodal mixture containing two distinct particle populations that differ in modal diameter and in the number of particles in the population.

Polymerization is generally carried out from about 48° C. to 94° C., and optionally from about 54° C. to 77° C. Polymerization is generally conducted in an acidic medium when acidic monomers are used and the pH of the latex binder is generally from about 1.0 to 6.5, optionally from about 1.5 to 4.0 and optionally from about 1.5 to 3.0.

In one embodiment, the latex may be prepared by employing controlled conversion techniques such as by adjusting the temperature, the rate of monomer addition, and/or the amount of crosslinking.

It will be appreciated that by controlling the gel fraction of the bimodal latex, a variety of coating formulations may be made for varying paper coating applications and conditions. The gel fraction is believed to be an indication of the extent of cross-linking present between polymer chains in the final structure of the polymer film. The amount of gel fraction may be controlled by various methods, such as the controlled addition of a chain-transfer agent, particularly when the chain transfer agent includes a branched $C_{12}$ alkyl mercaptan. The gel fraction of a latex composition may be determined as the percentage of dried polymer that is insoluble in a specific solvent after 8 hours immersion. In one or more embodiments, the latex of the present invention contains a controlled gel fraction of about 30 to 90 wt % that is insoluble in toluene at 20° C. Optionally, the latex contains a controlled gel fraction of about 50 to 80 wt %. In some embodiments, a latex coating having a gel fraction of about 30 to 60 wt % provides good porosity and rate of ink tack buildup (sometimes referred to as slope). By increasing the gel fraction to about 70 to 80 wt % it is often possible to reduce porosity and lower the slope.

The amount of solids in the latex is generally from about 40 to about 60, optionally from about 45 to about 55 wt %, optionally about 50 wt %, based upon the total weight of the latex and the remaining ingredients, e.g., water.

In certain embodiments, the latex of this invention is employed in a coating formulation, where the coating formulation also includes an amount of a finely divided mineral filler. Exemplary mineral fillers include kaolin clay, satin white, calcium carbonate, and titanium oxide. The amount of filler employed in the coating formulation can vary, depending upon the density of the filler and the coating properties desired. Typically, coating formulations include latex particles in an amount of from about 2 to about 25, optionally from about 8 to about 16 parts by weight of latex per 100 parts of filler. In one or more embodiments, the coating formulation includes from about 40 to about 70 percent solids by weight, optionally from about 55 to about 68 percent solids by weight.

The coating formulation may optionally further include one or more co-binders (e.g., starch, protein, polyvinyl alcohol, Carboxymethylcellulose), thickeners (e.g., acrylates, hydroxyethylcellulose), cross-linking agents, stabilizers, optical brighteners, lubricants, anti-foaming agents, surfactants, and water retention aids.

The coating formulations may be applied to a paper sheet or other cellulosic substrate via a conventional coating device. Exemplary methods of applying a latex coating to the paper include blade coaters, metered size press, air knife coaters, rod coaters, roll coaters, and the like. For a more detailed discussion of various coating devices reference is made to U.S. Pat. No. 4,474,860, and Coating Equipment and Processes, O. L. Booth, Lockwood Publishing Co., Inc., 1970, both of which are hereby incorporated by reference. Accordingly, embodiments of the present invention are directed toward methods for coating a cellulosic substrate with coating compositions that include the large acrylonitrile-rich particles of the present invention.

In some embodiments, the coating formulations of the present invention exhibit improved coating strength, as evidenced by wet pick and dry pick tests and paper printing strength with the P&I Stability test. In addition, the coating formulations often exhibit good paper and print gloss and brightness.

In certain embodiments, the bimodal latex gives low P&I slopes, indicating slower absorption of the offset ink vehicle into the sheet, a reduced rate of ink tack build, and therefore better printing strength. In one embodiment, the bimodal latex also provides more P&I passes to failure before coating pick out, which is important for printing performance. Additionally, the bimodal latex provides improved wet pick and ink receptivity in certain embodiments, particularly in coating formulations where low levels of starch are used as a co-binder.

In one or more embodiments, excellent printing strength and greater porosity can be achieved with the latex compositions of the present invention, when compared to conventional carboxylated styrene-butadiene and styrene-butadiene-acrylonitrile lattices. Accordingly, embodiments of the present invention are directed toward methods of printing coated paper, where the coated paper has been coated with coating compositions that include large acrylonitrile-rich particles. These printing methods may advantageously include both offset and rotogravure printing processes. As those skilled in the art appreciate, offset printing, which is also known as lithography, involves the use of printing and non-printing areas on the same plane that differ in their receptivity of ink and water; the printing areas accept the ink and the nonprinting areas accept the water. The ink is transferred from an inked plate to an intermediate cylinder covered with a rubber blanket that transfers the ink to the paper (i.e., paper coating). This process is repeated multiple times for multi-color printing, which may include from 4 to as many as 8 printing stages. When subjected to offset printing, the coated paper surface undergoes tack, pick forces developed in each color station. It is therefore advantageous for the coating to exhibit strength.

This strength includes both binding strength of the coating as well as adhesion of the coating to the paper. Tests for coated papers that quantify the strength of the coating for offset printing include IGT dry pick strength and ink interaction (P&I), which quantifies strength by the number of passes to fail and the rate of tack build-up on the paper surface which is represented as slope.

As those skilled in the art also appreciate, rotogravure printing includes the use of a cylinder that includes tiny wells (also referred to as cells), that hold ink while the non-image areas are scraped clean with a metal doctor blade that contacts the smooth outer surface of the cylinder. Multi-color images are prepared by passing coated paper through a series of cylinder stations. Printability is manifested by the ability to transfer ink from the tiny cells on the coated paper without skipping. This property can be quantified by employing an industry standard test called Helio missing dots, where one measures the distance in centimeters down a strip of paper where a laboratory engraved cylinder transfers ink or oil onto a paper substrate. Desirable printability is typically contingent on a smooth surface that has surface conformability (i.e., compressibility).

It has advantageously been discovered that coating compositions including the large acrylonitrile-rich particles of the present invention are technologically useful in both offset and rotogravure printing processes. Accordingly, embodiments of the present invention provide methods for supplying the printing industry with a binder composition (i.e., paper coating composition) that is technologically useful for coating paper substrate and employing the coated substrate for either or both rotogravure and offset printing processes.

In order to demonstrate the practice of the present invention, the following examples have been prepared and tested. The examples should not, however, be viewed as limiting the scope of the invention. The claims will serve to define the invention.

EXAMPLES

Inventive Example 1 was prepared by incremental emulstion polymerization techniques described herein. The characteristics of the latex are provided in Table 1. This latex was analyzed against 3 controls. Controls 2 and 3 were prepared in by emulsion polymerization similar to Inventive Example 1, except that the amount of acrylonitrile was limited, and had the characteristics shown in Table 1. Control 1 was a commercially available coating composition for rotogravure printing, having the composition and properties set forth in Table 1.

TABLE 1

| | Example | | | |
|---|---|---|---|---|
| | Control 1 | Control 2 | Control 3 | Inventive 4 |
| Binder chemistry | SB | SBA | SBA | SBA |
| Tg | −28 | −10 | −2 | −21 |
| Particle Size (nm) | 180-210 | 170-200 | 180-210 | 200-230 |
| Acrylonitrile (phm) | 0 | <15 | <10 | >20 |
| Styrene/Bd ratio | 0.84 | 0.74 | 1.28 | 0.31 |
| Roughness PPS-10, microns | 79 | 77 | 78 | 72 |
| Helio, cm | 50 | 38 | 50 | 63 |

Rotogravure coatings were applied onto a 48-gsm (32-Lb/3,330 ft²) light-weight coated basestock. Coating makedown with these latexes were prepared in the laboratory with 90 pph (parts per hundred pigment) delaminated clay, 10 calcined clay, 2.0 lubricant, 0.2 polyacrylate dispersant, and 6.5 latex. According to standard practice, Brookfield viscosities were adjusted to the range of 1200-1600 mPas with variable acrylate thickener at a pH between 8.0 and 8.5. Total coating solids were 58.6±0.3%, yielding coat weights of 7.5 gsm (Sib.). Coatings were applied with a Cylinder Laboratory Coater™ (CLC). Supercalendering was performed on a laboratory calendar to achieve about 0.8 Parker PrintSurf (S-1 0) with the control latex coated paper.

Wet coating properties, Brookfield viscosity and Hercules Hi-shear viscosities were in acceptable ranges for all Table 1 latexes. Within experimental error all samples were equivalent in Paper gloss (450 TAPPI Standard). As seen in Table 1, Inventive Example 1 exhibited benefits in both smoothness and Helio printability. Thus, Inventive Example 1 provides improved smoothness and Helio printability while maintaining good gloss, thereby providing an improved rotogravure coating composition.

The latex of the present invention used to prepare Inventive Example 1 above was used to prepare two additional inventive samples for offset printing analysis. In one instance the latex was combined with ground calcium carbonate (Covercarb® 85 available from Omya North America), to prepare Inventive Example 2. Another sample was combined with precipitated calcium carbonate (Omyaprime® 85 available from Omya North America) to prepare Inventive Example 3. Commercially available offset printing compositions having the composition and properties set forth in Table 2, i.e. relatively small particle size were combined with ground calcium carbonate to prepare control examples 4 and 5. Similarly these commercial latexes were combined with precipitated calcium carbonate to form control examples 6 and 7.

TABLE 2

| | Examples | | | | | |
|---|---|---|---|---|---|---|
| | Inventive 2 | Control 4 | Control 5 | Inventive 3 | Control 6 | Control 7 |
| Binder Chemistry | SBA | SB | SBA | SBA | SB | SBA |
| Tg, ° C. | −21 | −2 | +8 | −21 | −2 | +8 |
| Particle Size (nm) | 200-230 | 125 | 120 | 200-230 | 125 | 120 |
| EGT | 256 | 253 | 196 | 244 | 242 | 184 |
| Passes to Fail | 10 | 8 | 9 | 6 | 5 | 6 |

Coatings were formulated with 85 pph of calcium carbonate (ground or precipitated), 10 parts latex (comparative examples), 1.7 Hollow sphere (Rohm & Haas\F 1353), 0.4 Glyoxal crosslinker (SunKote-455), and 5 parts starch (Penford PenGum 290). Coatings were applied at pH of 8.5 and 62% total solids to a 105 gsm (70 Lb.) web offset basesheet. Paper samples with 8.8 lb. coat weights were supercalendered to 70-72 gloss.

Two strength measurements were used: IGT VVP dry pick strength and Iodcel (NPA Graphic Arts Testing Equipment) passes-to-fail. IGT is a measure of the adhesive strength of the polymer, whereas the Iodcel NPA measures the rate of ink tack build and gauges the surface strength in multi-station offset printing. It can be seen that Inventive Examples 2 and 3 have improved or equivalent strength and improved or equivalent passes to fail, when compared to commercially available offset coating compositions.

Various modifications and alterations that do not depart from the scope and spirit of this invention will become apparent to those skilled in the art. This invention is not to be duly limited to the illustrative embodiments set forth herein.

The invention claimed is:

1. A latex binder for a pigmented paper coating, the latex including emulsion copolymer particles, said copolymer comprising, based on the total weight of constituent mer units, (i) from about 15 to about 35 weight % mer units deriving from the polymerization of acrylonitrile;
(ii) from about 25 to about 65 weight % mer units deriving from the polymerization of conjugated diene monomer; and
(iii) from about 5 to about 55 weight % mer units deriving from the polymerization of alkenyl aromatic monomer, where the emulsion copolymer particles have a weight average diameter of greater than 150 nm.

2. The latex binder of claim 1, where the latex copolymer is characterized by a Tg of less than 20° C. and at least −50° C.

3. The latex binder of claim 1, where the latex copolymer is characterized by a Tg of less than 15° C. and at least −35° C.

4. The latex binder of claim 1, where the latex copolymer is characterized by a Tg of less than 10° C. and at least −30° C.

5. The latex binder of claim 1, where the copolymer further comprises from about 0.2 to about 8 weight % mer units deriving from the polymerization of acid monomer.

6. The latex binder of claim 5, where the acid monomer is selected from the group consisting of ethylenically unsaturated carboxylic acids, ethylenically unsaturated sulfonic acids, and ethylenically unsaturated phosphonic acids.

7. The latex binder of claim 5, where the acid monomer is selected from the group consisting of acrylic acid, methacrylic acid, fumaric acid, crotonic acid, maleic acid, itaconic acid, 2-carboxyethylacrylate, 2-acrylamido-2-methylbutanoic acid, and the like, and combinations of two or more such acids.

8. The latex binder of claim 1, where the copolymer further comprises from about 1 to about 8 weight % mer units deriving from the polymerization of functional monomer.

9. The latex binder of claim 8, where the functional monomer comprises amide or hydroxyl functionality.

10. The latex binder of claim 1, where the copolymer further comprises mer units deriving from 2-hydroxyethylacrylate, 2-hydroxyethylmethacrylate, 4-hydroxybutylacrylate, 4-hydroxybutylmethacrylate, hydroxypropylacrylate, and hydroxy-propylmethacrylate.

11. The latex binder of claim 1, where the copolymer further comprises mer units deriving from salts of (meth)allyl sulfonic acid, styrene sulfonic acid, 2-acrylamide-2-methylpropane sulfonic acid, 3-sulfopropyl(meth)acrylate, or 2-sulfoethyl(meth)-acrylate.

12. The latex binder of claim 1, where the conjugated diene monomer is selected from the group consisting of 1,3-butadiene, isoprene, 2,3-dimethyl-1,3-butadiene, 1,3-cyclohexadiene, and 2-chloro-1,3-butadiene.

13. The latex binder of claim 1, where the alkenyl aromatic is selected from the group consisting of styrene, 4-tertiary-butyl styrene, 4-methylstyrene, and alpha-methylstyrene.

14. The latex binder of claim 1, where the emulsion copolymer particles have a weight average diameter of at least 180 nm.

15. The latex binder of claim 1, where said emulsion copolymer particles form a first particle population, and where said latex binder further comprises a second particle population that is distinct from said first particle population.

* * * * *